(12) United States Patent
Yin et al.

(10) Patent No.: US 12,511,930 B2
(45) Date of Patent: Dec. 30, 2025

(54) OPTICAL SENSING PIXEL CIRCUIT AND DRIVING METHOD THEREFOR, AND SENSOR AND DISPLAY PANEL

(71) Applicant: BOE Technology Group Co., Ltd., Beijing (CN)

(72) Inventors: Xinshe Yin, Beijing (CN); Tao Gao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 371 days.

(21) Appl. No.: 18/269,985

(22) PCT Filed: Oct. 22, 2021

(86) PCT No.: PCT/CN2021/125847
§ 371 (c)(1),
(2) Date: Jun. 28, 2023

(87) PCT Pub. No.: WO2022/183745
PCT Pub. Date: Sep. 9, 2022

(65) Prior Publication Data
US 2024/0071126 A1    Feb. 29, 2024

(30) Foreign Application Priority Data

Mar. 3, 2021 (CN) .......................... 202110237022.X

(51) Int. Cl.
*G06V 40/13*    (2022.01)
*G09G 3/3225*    (2016.01)

(52) U.S. Cl.
CPC ....... *G06V 40/1318* (2022.01); *G09G 3/3225* (2013.01)

(58) Field of Classification Search
None
See application file for complete search history.

(56) References Cited

U.S. PATENT DOCUMENTS

| | | | |
|---|---|---|---|
| 12,022,211 B1* | 6/2024 | Chen | H04N 25/707 |
| 2006/0202038 A1* | 9/2006 | Wang | G06K 7/10732 |
| | | | 235/462.24 |

(Continued)

FOREIGN PATENT DOCUMENTS

| | | |
|---|---|---|
| CN | 101644587 A | 2/2010 |
| CN | 110073361 A | 7/2019 |

(Continued)

OTHER PUBLICATIONS

PCT/CN2021/125847 international search report.

*Primary Examiner* — Darryl V Dottin
(74) *Attorney, Agent, or Firm* — IPro, PLLC

(57) ABSTRACT

Disclosed are an optical sensing pixel circuit and a driving method therefor, and a sensor and a display panel. The optical sensing pixel circuit includes: a photodiode which is used for detecting an external optical signal and converting the optical signal into an electric signal; an amplification circuit which is electrically connected to the photodiode and used for amplifying the electric signal into a detectable large-current signal; and a constant current bias circuit which is electrically connected to an output end of the amplification circuit and used for providing a constant current for the amplification circuit so as to set a quiescent operating point having the same current as the constant current for the amplification circuit, such that the amplification circuit amplifies the electric signal on the basis of the quiescent operating point.

20 Claims, 11 Drawing Sheets

(56) References Cited

U.S. PATENT DOCUMENTS

| | | |
|---|---|---|
| 2010/0207889 A1 | 8/2010 | Chen et al. |
| 2018/0173922 A1 | 6/2018 | Ghavanini et al. |
| 2020/0225806 A1 | 7/2020 | Ding et al. |
| 2021/0174051 A1 | 6/2021 | Wang et al. |

FOREIGN PATENT DOCUMENTS

| | | |
|---|---|---|
| CN | 110763336 A | 2/2020 |
| CN | 110858297 A | 3/2020 |
| CN | 113011292 A | 6/2021 |

\* cited by examiner at a bias setting stage, switching on a first switching transistor and a second switching transistor, making a constant current bias circuit provide a constant current for an amplification circuit, so as to set a first voltage corresponding to outputting of the constant current for a driving transistor of the amplification circuit, and store the first voltage into a storage capacitor, wherein the first voltage is a voltage difference between a control end of the driving transistor and a first end of the driving transistor, and the first voltage comprises a threshold voltage of the driving transistor ~901 at a signal reading stage, switching off the first switching transistor and the second switching transistor, switching on a third switching transistor, meanwhile, firstly resetting an integrating circuit, then disconnecting the third switching transistor, so as to make the integrating circuit start to integrate a current signal at an output end of the amplification circuit, generate a voltage variable quantity on an integrating capacitor, and calculate currents output by the amplification circuit according to integrating time and the voltage variable quantity ~902

Fig. 9

OPTICAL SENSING PIXEL CIRCUIT AND DRIVING METHOD THEREFOR, AND SENSOR AND DISPLAY PANEL

CROSS REFERENCE TO RELATED APPLICATIONS

The present application is a National Stage of International Application No. PCT/CN2021/125847, filed Oct. 22, 2021, which claims priority to Chinese Patent Application No. 202110237022.X, field on Mar. 3, 2021 to the China National Intellectual Property Administration and entitled "Optical Sensing Pixel Circuit and Driving Method therefor, and Sensor and Display Panel", the entire contents of which are incorporated herein by reference.

TECHNICAL FIELD

The present disclosure relates to the field of fingerprints, in particular to an optical sensing pixel circuit and a driving method therefor, and a sensor and a display panel.

BACKGROUND

With wide application of OLED display screens, integrating sensors on the OLED display screens has been a common trend.

Integrating the sensors on the OLED display screens may be implemented by using a Thin Film Transistor, TFT, technology, on the one hand, expenses of the sensors may be reduced, and on the other hand, volumes and weights of these devices may further be decreased. For example, integrating fingerprint sensors on the OLED display screens needs to manufacture photoelectric sensors in the display screens, then to read data of the photoelectric sensors in light and dark states through external circuits, so as to obtain fingerprint information.

However, currents output by the photoelectric sensors are very weak, usually range from 01 pA to 10 pA, which makes a fingerprint collection circuit difficultly read the weak currents output by the photoelectric sensors, resulting in not accurately obtaining the fingerprint information.

SUMMARY

An embodiment of the present disclosure provides an optical sensing pixel circuit and a driving method therefor, and a sensor and a display panel, for solving the above technical problems existing in the prior art.

In a first aspect, in order to solve the above technical problems, an embodiment of the present disclosure provides an optical sensing pixel circuit, including:
- a photodiode, one end of the photodiode being electrically connected with a constant voltage end, wherein the photodiode is configured to detect an external optical signal and convert the optical signal into an electric signal, and the electric signal is weak and is not easily detected;
- an amplification circuit, electrically connected with the other end of the photodiode, where the amplification circuit is configured to amplify the electric signal into a detectable large current signal; and
- a constant current bias circuit, electrically connected with an output end of the amplification circuit, where the constant current bias circuit is configured to provide a constant current for the amplification circuit so as to set a quiescent operating point with a same current as the constant current for the amplification circuit, where the amplification circuit is further configured to amplify the electric signal on the basis of the quiescent operating point.

In some embodiments, the constant current bias circuit includes:
- a constant current source, configured to provide the constant current; and
- a first switching transistor, connected between the constant current source and the output end of the amplification circuit, where the first switching transistor is configured to provide the constant current to the amplification circuit at a bias setting stage.

In some embodiments, the amplification circuit includes:
- a driving transistor, a first end of the driving transistor being electrically connected with the constant voltage end, a second end of the driving transistor serving as the output end of the amplification circuit, and a control end of the driving transistor being electrically connected with the output end of the photodiode;
- a storage capacitor, one end of the storage capacitor being electrically connected with the constant voltage end, and a second end of the storage capacitor being electrically connected with the control end of the driving transistor, where the storage capacitor is configured to store a first voltage of the driving transistor and receive the electric signal in a case that an output current of the driving transistor is the constant current, the first voltage is a voltage difference between the control end of the driving transistor and the first end of the driving transistor, and the first voltage includes a threshold voltage of the driving transistor; and
- a second switching transistor, a first end of the second switching transistor being electrically connected with the control end of the driving transistor, and a second end of the second switching transistor being electrically connected with the second end of the driving transistor, wherein the second switching transistor is switched on at the bias setting stage, so that the driving transistor stores the first voltage into the storage capacitor under an action of the constant current, and the driving transistor outputs the constant current at an amplification state.

In some embodiments, the constant current is 10 times larger than a leakage current of the photodiode.

In some embodiments, the optical sensing pixel circuit further includes:
- a current detecting circuit, electrically connected with the output end of the amplification circuit, the current detecting circuit being configured to detect the large current signal at a signal reading stage, and convert the large current signal into a corresponding voltage drop signal.

In some embodiments, the current detecting circuit includes:
- a third switching transistor, a first end of the third switching transistor being electrically connected with the output end of the amplification circuit, where the third switching transistor is switched on at the signal reading stage, and configured to receive the large current signal; and
- an integrating circuit, an input end of the integrating circuit being electrically connected with a second end of the third switching transistor, an output end of the integrating circuit serving as an output end of the current detecting circuit, where the integrating circuit is configured to be reset after a reset end of the integrating circuit receives a reset signal, and integrate the large current signal after being reset to generate the voltage drop signal.

In some embodiments, the integrating circuit includes:

an integrating arithmetic unit, a first input end of the integrating arithmetic unit serving as an input end of the integrating circuit, an output end of the integrating arithmetic unit serving as the output end of the integrating circuit, and a second end of the integrating arithmetic unit being connected with a reference voltage end;

an integrating capacitor, a first end of the integrating capacitor being electrically connected with the first input end of the integrating arithmetic unit, and a second end of the integrating capacitor being electrically connected with the output end of the integrating arithmetic unit, where the integrating capacitor is configured to integrate the large current signal and generate a voltage drop on the integrating capacitor; and a reset device, a first end of the reset device being electrically connected with the first input end of the integrating arithmetic unit, a second end of the reset device being electrically connected with the output end of the integrating arithmetic unit, where the reset device is configured to reset the integrating capacitor and the out end of the amplification circuit.

In a second aspect, an embodiment of the present disclosure provides a driving method of the optical sensing pixel circuit as described in the first aspect, including:

at a bias setting stage, switching on a first switching transistor and a second switching transistor, making a constant current bias circuit provide a constant current for an amplification circuit, so as to set a first voltage corresponding to outputting of the constant current for a driving transistor of the amplification circuit, and store the first voltage into a storage capacitor, wherein the first voltage is a voltage difference between a control end of the driving transistor and a first end of the driving transistor, and the first voltage includes a threshold voltage of the driving transistor; and at a signal reading stage, switching off the first switching transistor and the second switching transistor, switching on a third switching transistor, meanwhile, firstly resetting an integrating circuit, then disconnecting the third switching transistor, so as to make the integrating circuit start to integrate a current signal at an output end of the amplification circuit, generate a voltage variable quantity on an integrating capacitor, and calculate currents output by the amplification circuit according to integrating time and the voltage variable quantity.

In a third aspect, an embodiment of the present disclosure provides a sensor, including the optical sensing pixel circuits distributed in an array as described in the first aspect.

In some embodiments, the optical sensing pixel circuits located in a same column share one constant current bias circuit.

In some embodiments, the sensor includes a detection area and a non-detection area surrounding the detection area;

a plurality of photodiodes are arranged in an array in the detection area; and the constant current bias circuit is arranged in the non-detection area.

In a fourth aspect, an embodiment of the present disclosure provides a display panel, including the sensor as described in the third aspect.

BRIEF DESCRIPTION OF FIGURES

FIG. 9 is a driving method of an optical sensing pixel circuit provided by an embodiment of the present disclosure.

DETAILED DESCRIPTION

Embodiments of the present disclosure provide an optical sensing pixel circuit and a driving method therefor, and a sensor and a display panel, for solving the above technical problems existing in the prior art.

Knowledge related to the present disclosure:

a quiescent operating point refers to that in a transistor amplification circuit, when an alternating current inputting signal is zero, the circuit is in a direct current operating state, these numerical values of currents and voltages may be represented by certain points on a BJT characteristic curve of a transistor, and the points are traditionally called quiescent operating points Q.

In order to make the above objectives, features and advantages of the present disclosure more obvious and easier to understand, accompanying drawings and embodiments will be combined to further illustrate the present disclosure below. However, embodiments may be implemented in multiple forms, and should not be understood to be limited in the illustrated embodiments herein; and on the contrary, these embodiments are provided to make the present disclosure more comprehensive and complete, and conceptions of embodiments are comprehensively conveyed to those skilled in the art. Same accompanying drawing labels in figures represent the same or similar structure, thus repeated description of them will be omitted. Words describing expression positions and directions in the present disclosure are all illustrated taking the accompanying drawings as an example, may also have changes according to the needs, and the changes are all included in a scope of protection of the present disclosure. The accompanying drawings of the present disclosure are only used to illustrate a relative position relationship and do not represent a true sale.

It needs to be noted that specific details are explained in following descriptions to conveniently understand the preset disclosure. However, the preset disclosure may be implemented in multiple other forms different from the form described herein, and those skilled in the art may do similar promotion without violating contents of the present disclosure. Therefore, the present disclosure is not limited by specific implementations of the present disclosure below. The specification is subsequently described as an exemplary embodiment for implementing the present disclosure. However, the description takes general principles of the present disclosure as an objective, and is not used to limit the scope of the present disclosure. The scope of protection of the present disclosure should be as defined in attached claims.

The optical sensing pixel circuit and the driving method therefor, and the sensor and the display panel provided by the embodiments of the present disclosure are illustrated in conjunction with the accompanying drawings below.

Figure 1:
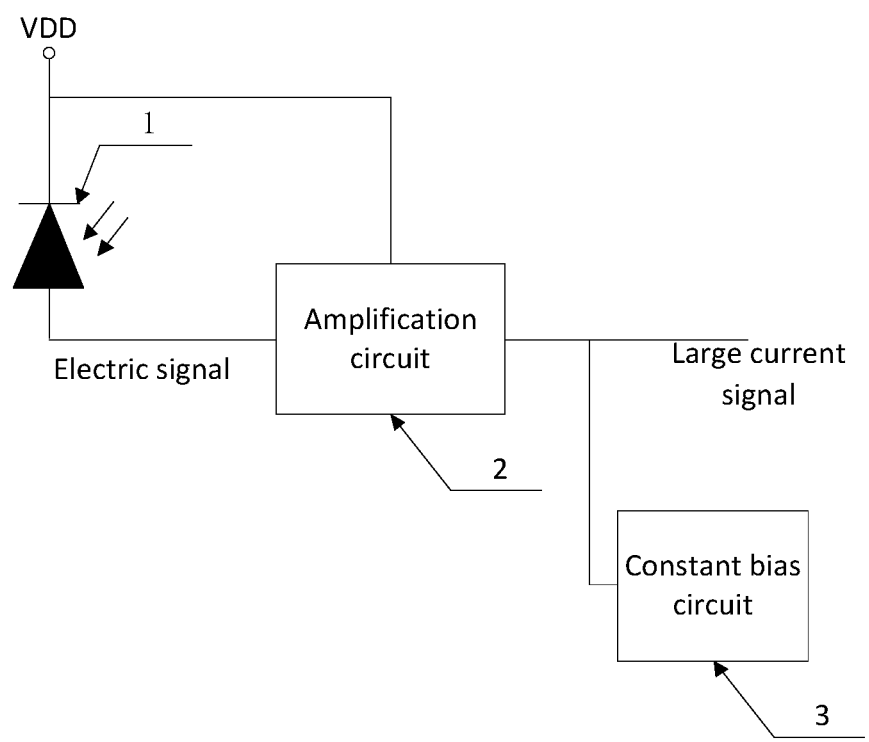
FIG. 1 is a first schematic structural diagram of an optical sensing pixel circuit provided by an embodiment of the present disclosure.

Please refer to FIG. 1, and FIG. 1 is a first schematic structural diagram of an optical sensing pixel circuit provided by an embodiment of the present disclosure. The optical sensing pixel circuit includes:

a photodiode 1, one end of the photodiode 1 is electrically connected with a constant voltage end VDD, the photodiode 1 is configured to detect an external optical signal and convert the optical signal into an electric signal, and the electric signal is weak and is not easily detected;

an amplification circuit 2, electrically connected with the photodiode 1, the amplification circuit 2 is configured to amplify a difficulty-detected electric signal outputted by the photodiode 1 into a detectable large current signal; and a constant current bias circuit 3, electrically connected with an output end of the amplification circuit 2, where the constant current bias circuit 3 is configured to provide a constant current for the amplification circuit 2 so as to set a quiescent operating point with a same current as the constant current for the amplification circuit 2, the amplification circuit 2 is further configured to amplify the electric signal outputted by the photodiode 1 on the basis of the quiescent operating point.

In FIG. 1, a power end of the amplification circuit 2 is also electrically connected with the constant voltage end VDD.

The constant current bias circuit 3 provides the constant current for the amplification circuit 2, so that the amplification circuit 2 is arranged at the quiescent operating point with the same current with the constant current, and the amplification circuit 2 amplifies the difficulty-detected weak electric signal output by the photodiode 1 into the detectable large current signal on the basis of the quiescent operating point.

Figure 2:
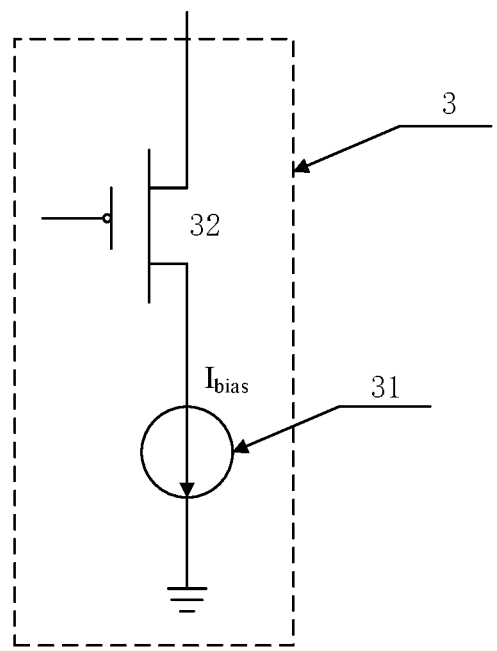
FIG. 2 is a schematic structural diagram of a constant current bias circuit provided by an embodiment of the present disclosure.

Please refer to FIG. 2, and FIG. 2 is a schematic structural diagram of a constant current bias circuit provided by an embodiment of the present disclosure.

The constant current bias circuit 3 includes:

a constant current source 31, configured to provide the constant current $I_{bias}$;

a first switching transistor 32, connected between the constant current source 31 and the amplification circuit 2, where the first switching transistor 32 is configured to provide the constant current $I_{bias}$ to the amplification circuit 2 at the bias setting stage. The other end of the constant current source 31 is grounded. The first switching transistor 32 may be an N-type transistor, and may also be a P-type transistor, and the N-type transistor is illustrated in FIG. 2.

In some embodiments, the constant current $I_{bias}$ is 10 times greater than a leakage current of the photodiode 1.

The constant current $I_{bias}$ is 10 times greater than the leakage current of the photodiode 1, so that at the signal reading stage, the electric signal outputted by the photodiode 1 is determined according to the large current signal read from the output end of the amplification circuit 2.

Figure 3:
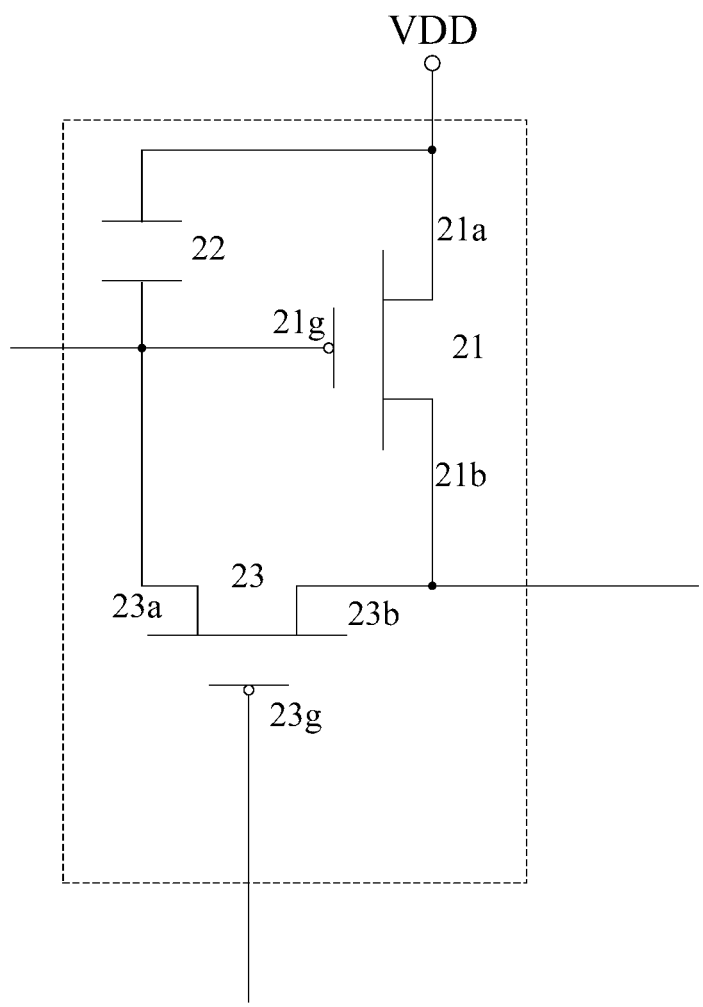
FIG. 3 is a schematic structural diagram of an amplification circuit provided by an embodiment of the present disclosure.

Please refer to FIG. 3, and FIG. 3 is a schematic structural diagram of an amplification circuit provided by an embodiment of the present disclosure.

The amplification circuit 2 includes:

a driving transistor 21, a first end 21a of the driving transistor 21 is electrically connected with a constant voltage end VDD, a second end 21b of the driving transistor 21 serves as an output end of the amplification circuit 2, and a control end 21g of the driving transistor 21 is electrically connected with an output end of a photodiode 1;

a storage capacitor 22, one end of the storage capacitor 22 is electrically connected with the constant voltage end VDD, and a second end of the storage capacitor 22 is electrically connected with the control end 21g of the driving transistor 21, where the storage capacitor 22 is configured to store a first voltage of the driving transistor 21 and receive an electric signal in a case that an output current of the driving transistor 21 is the constant current, where the first voltage is a voltage difference between the control end 21g of the driving transistor 21 and the first end 21a of the driving transistor 21, and the first voltage includes a threshold voltage of the driving transistor 21; and a second switching transistor 23, a first end 23a of the second switching transistor 23 is electrically connected with an output end of the photodiode 1, a second end 23b of the second switching transistor 23 is electrically connected with the second end 21b of the driving transistor 21, the second switching transistor 23 switches on (the second switching transistor 23 is switched on when a second control signal is received) the driving transistor 21 at a bias setting stage, so that the driving transistor 21 stores the first voltage into the storage capacitor 22 under an action of the constant current $I_{bias}$, and the driving transistor 21 outputs the constant current $I_{bias}$ in an amplification state.

After a control end 23g of the second switching transistor 23 receives the second control signal (namely at the bias setting stage), the driving transistor 21 and the second switching transistor 23 are both in a conducting state (meanwhile, the first switching transistor 32 also receives the first control signal in a conducting state), the constant current source 31 and the driving transistor 21 are connected in series, at the moment, a current outputted by the driving transistor 21 is the constant current $I_{bias}$, that is, at the moment, a bias grid voltage $V_{bias}$ with a conducting current of $I_{bias}$ is established at the control end 21g of the driving transistor 21, and the bias grid voltage $V_{bias}$ contains a threshold voltage $V_{th}$ of the driving transistor.

It may be known according to driving characteristics of the transistor:

$$V_{GS} = V_D - V_{bias} \qquad (1);$$

$$I_{bias} = \beta(V_{GS} - V_{th})^2 = \beta(V_D - V_{bias} - V_{th})^2 \qquad (2); \text{ and}$$

according to the formula, it may be contained that $$V_{bias} = V_{DD} - V_{th} - \sqrt{\frac{I_{bias}}{\beta}}. \quad (3)$$

$V_{Gs}$ represents a first voltage between the control end 21g of the driving transistor 21 and the second end 21b, VDD represents a voltage provided at the constant voltage end, $V_{th}$ represents a threshold voltage of the driving transistor 21, β represents an amplification times of the driving transistor 21, and $I_{bias}$ represents a conducting current of the driving transistor 21 (namely the constant current $I_{bias}$ provided by the constant current source 31). It may be seen from the formula (2) that the threshold voltage $V_{th}$ of the driving transistor is included in the bias grid voltage $V_{bias}$.

Figure 4:
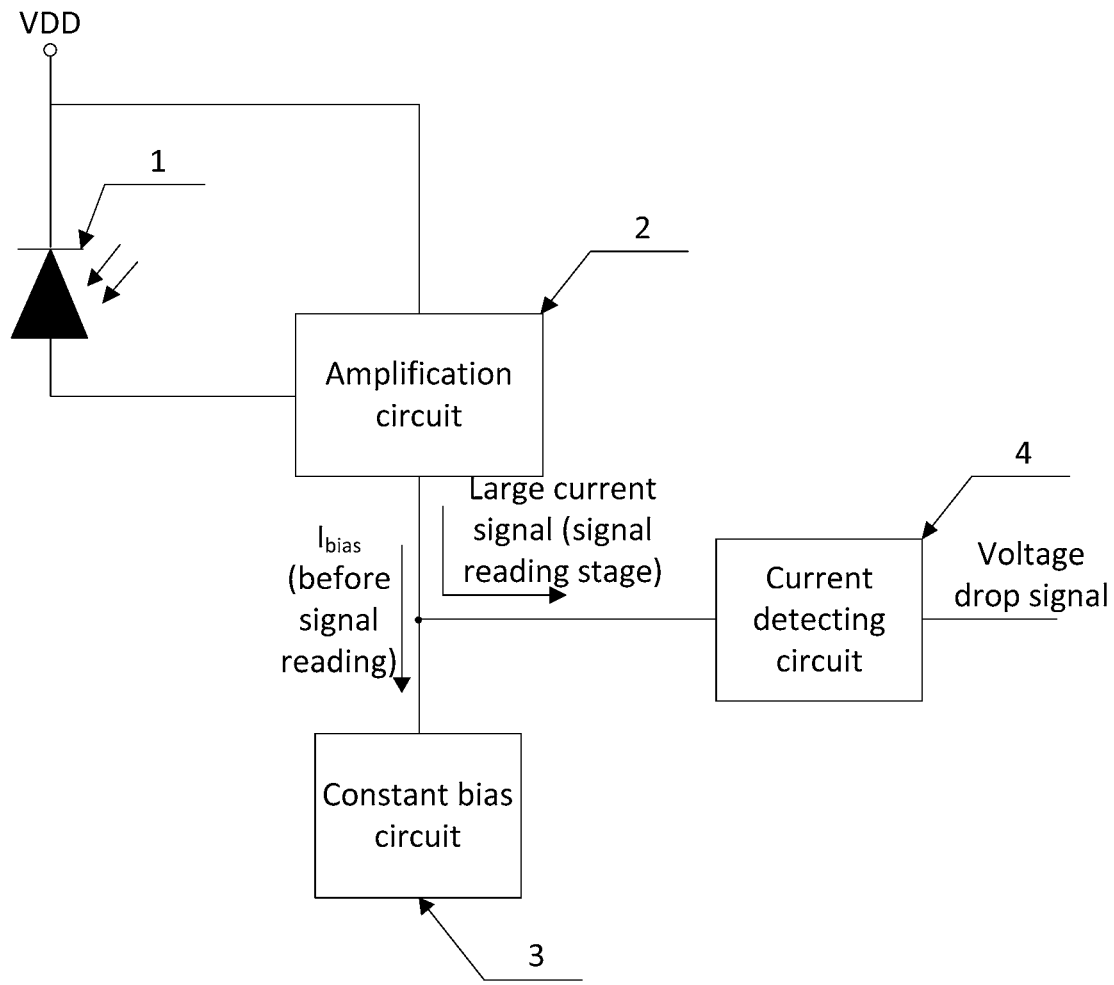
FIG. 4 is a second schematic structural diagram of an optical sensing pixel circuit provided by an embodiment of the present disclosure.

It needs to be noted that the driving transistor 21 and the second switching transistor 23 are transistors with the same polarity, they may be N-type transistors, and may also be P-type transistors, and which is not specifically limited. In FIG. 4, they are P-type transistors.

Please refer to FIG. 4, and FIG. 4 is a second schematic structural diagram of an optical sensing pixel circuit provided by an embodiment of the present disclosure. The optical sensing pixel circuit further includes: a current detecting circuit 4, the current detecting circuit 4 is electrically connected with the output end of the amplification circuit 2, and the current detecting circuit 4 is configured to detect the large current signal outputted by the amplification circuit 2, and convert the large current signal into the corresponding voltage drop signal.

Figure 5:
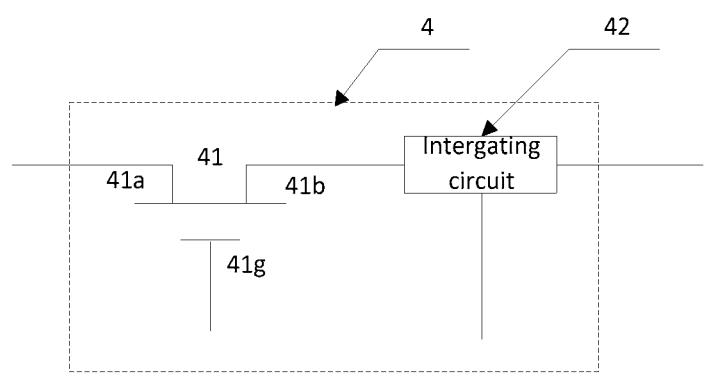
FIG. 5 is a schematic structural diagram of a current detecting circuit provided by an embodiment of the present disclosure.

Please refer to FIG. 5, and FIG. 5 is a schematic structural diagram of a current detecting circuit provided by an embodiment of the present disclosure.

The current detecting circuit 4 includes:
a third switching transistor 41, a first end 41a of the third switching transistor 41 is electrically connected with the output end of the amplification circuit 2, the third switching transistor 41 is switched on at the signal reading stage (the third switching transistor 41 is switched on after receiving a third control signal), and configured to receive the large current signal output by the amplification circuit 2; and the third switching transistor 41 is switched on after a control end 41g of the third switching transistor 41 receives the third control signal; and
an integrating circuit 42, an input end 42a of the integrating circuit 42 is electrically connected with a second end 41b of the third switching transistor 41, the input end 42a of the integrating circuit 42 serves as the output end of the current detecting circuit 4, and the integrating circuit 42 is configured to be reset after a reset end 42s of the integrating circuit 42 receives a reset signal, and integrate the large current signal output by the amplification circuit 2 after being reset to generate a voltage drop signal.

At the signal reading stage, the first switching transistor 32 and the second switching transistor 23 are in a cut-off state, the third switching transistor 41 and the driving transistor 21 are in a conducting state, the reset end 42s of the integrating circuit 42 resets the integrating circuit 42 after receiving the reset signal, then the large current signal output by the driving transistor 21 is integrated, and the voltage drop signal corresponding to the large current signal is generated on the integrating circuit 42.

Figure 6:
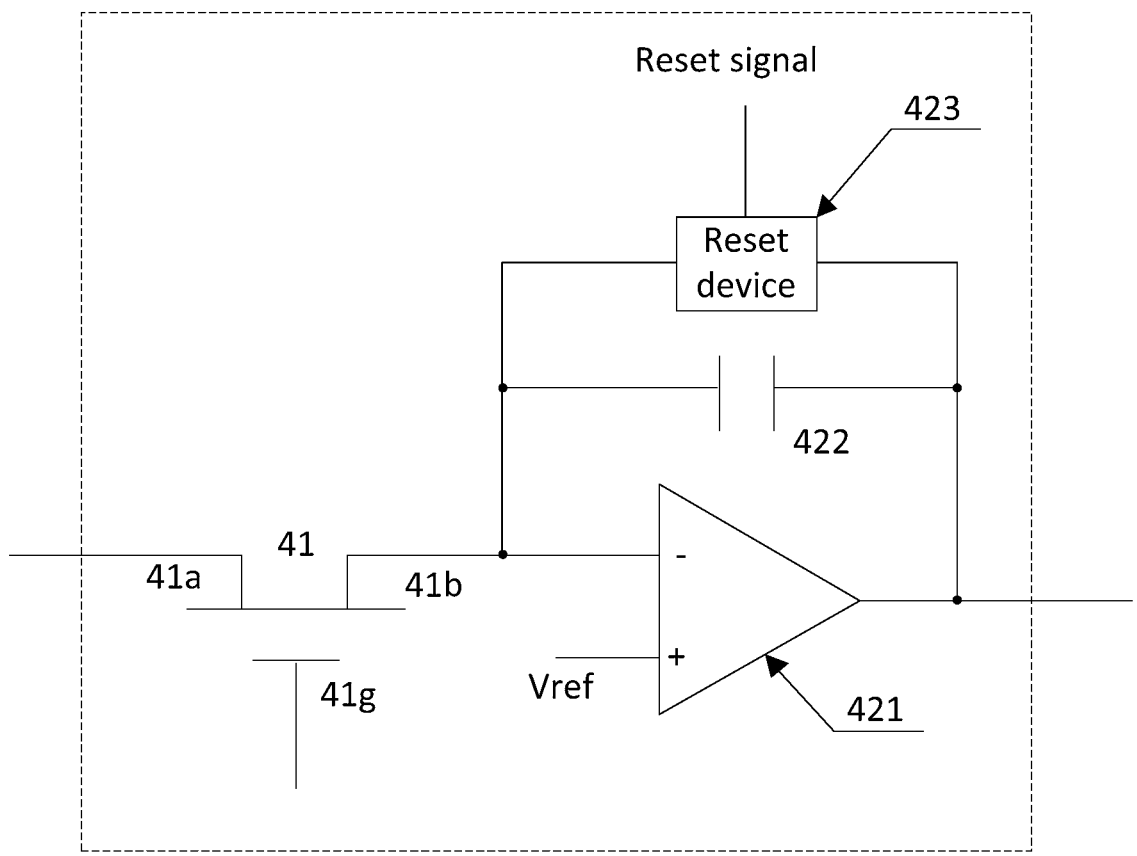
FIG. 6 is a schematic structural diagram of an integrating circuit provided by an embodiment of the present disclosure.

Please refer to FIG. 6, and FIG. 6 is a schematic structural diagram of an integrating circuit provided by an embodiment of the present disclosure.

The integrating circuit 42 includes: an integrating arithmetic unit 421, an integrating capacitor 422, and a reset device 423.

A first input end (may also be called a reverse input end) of the integrating arithmetic unit 421 serves as an input end of the integrating circuit 42, an output end of the integrating arithmetic unit 421 is an output end of the integrating circuit 42, and a second input end (may also be called a non-inverting input end) of the integrating arithmetic unit 421 is connected with a reference voltage end Vref.

For the integrating capacitor 422, a first end of the integrating capacitor 422 is electrically connected with the first input end of the integrating arithmetic unit 421, and a second end of the integrating capacitor 422 is electrically connected with the output end of the integrating arithmetic unit 421, and configured to integrate the large current signal outputted by the amplification circuit 2 and generate a corresponding voltage drop signal on the integrating capacitor.

For the reset device 423, a first end of the reset device 423 is electrically connected with the first input end of the integrating arithmetic unit 421, a second end of the reset device 423 is electrically connected with the output end of the integrating arithmetic unit 421, and the reset device 423 is configured to reset the output ends of the integrating capacitor 422 and the amplification circuit 2.

After the output ends of the integrating capacitor 422 and the amplification circuit 2 are reset by the reset device 423, the integrating capacitor 422 starts to integrate the detected large current signal I, an electric charge of the driving transistor 21 generated within integrating time $T_1$ is that $Q=I\times T_1$, a voltage drop ($V_{c1}$) generated in the integrating capacitor 422 is that:

$$V_{c1}=Q/C_1=I\times T_1/C_1 \quad (4);$$

where $C_1$ represents a capacitance of the integrating capacitor 422.

Figure 7:
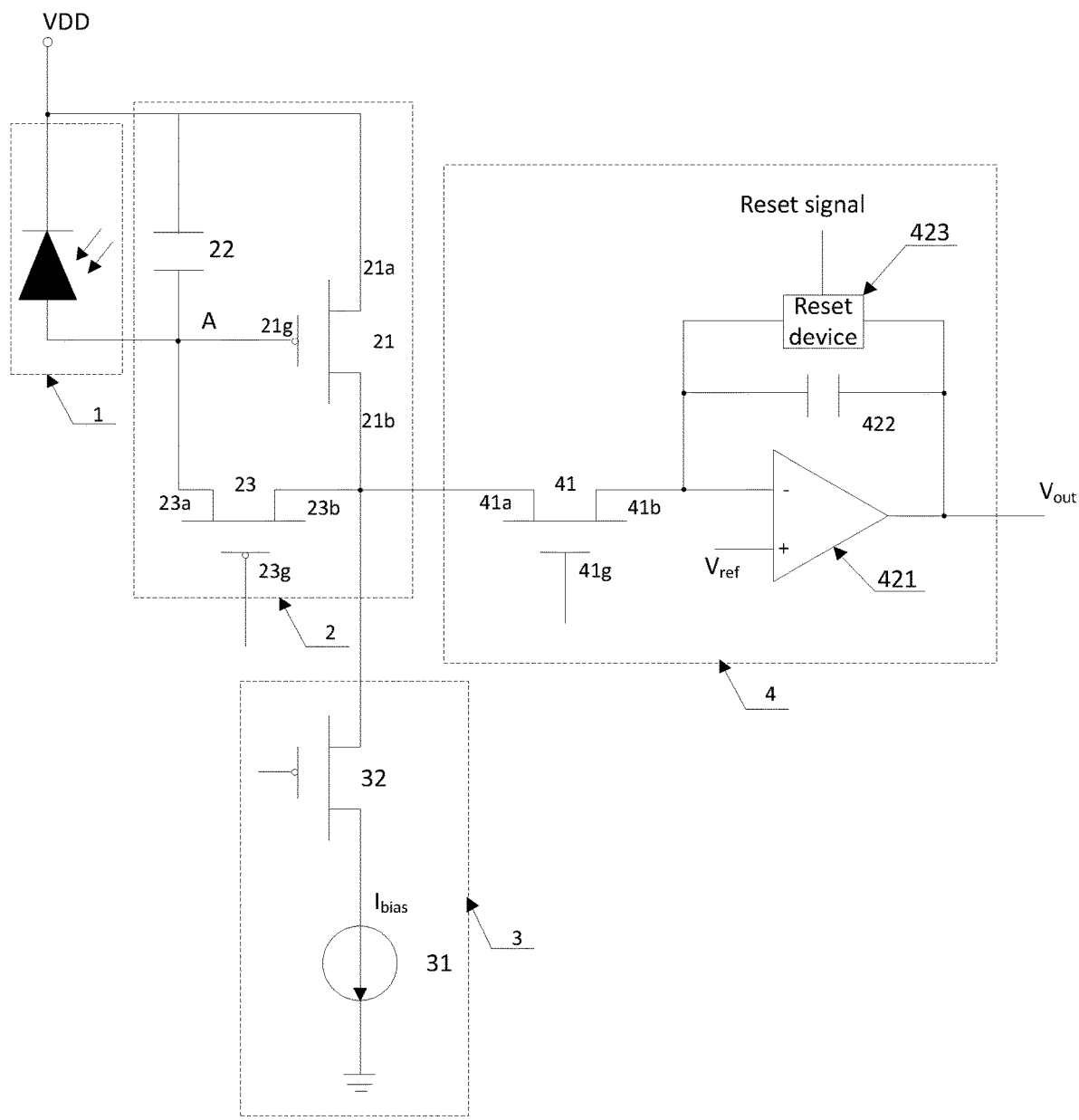
FIG. 7 is a third schematic structural diagram of an optical sensing pixel circuit provided by an embodiment of the present disclosure.

Please refer to FIG. 7, and FIG. 7 is a third schematic structural diagram of an optical sensing pixel circuit provided by an embodiment of the present disclosure.

The optical sensing pixel circuit in the embodiment of the present disclosure includes two stages, one is a bias setting stage, and the other is a signal reading stage.

At the bias setting stage, after a first control signal and a second control signal are received at the same time, a first switching transistor 32 and a second switching transistor 23 are controlled to be conducted (at the moment, a third switching transistor 41 is in a cut-off state), a constant current $I_{bias}$ is provided to a driving transistor 21, so that the driving transistor 21 outputs a current the same as the constant current $I_{bias}$, and a voltage difference (namely a first voltage difference) between a control end 21g of the driving transistor 21 and a first end 21a of the driving transistor 21 is stored into a storage capacitor 22.

At the signal reading stage, after a third control signal is received, the third switching transistor 41 is controlled to be conducted (at the moment, the first switching transistor 32 and the second switching transistor 23 are in a cut-off state).

At this stage, a photodiode 1 converts an optical signal into an electric signal to be stored into the storage capacitor 22 (that is, a leakage current $I_{RD}$ charges the storage capacitor 22), and assuming that charging time is $T_2$, and a capacitance of the storage capacitor 22 is $C_2$, then an electric charge increased on the storage capacitor 22 is:

$$\Delta Q = \Delta V_{c2} \times C_2 = I_{RD}\lambda T_2 \quad (5);$$

where $\Delta V_{c2}$ represents a voltage increment increased on the storage capacitor 22, $I_{RD}$ represents a leakage current generated by the photodiode 1, and $T_2$ represents a charge duration of the storage capacitor 22.

It may be calculated from a formula (5): $\Delta V_{c2} = \Delta Q / C_2 = I_{RD} \times T_2 / C_2$ (6).

At the bias setting stage, the first voltage is stored into the storage capacitor 22, a voltage at the output end of the photodiode 1 (namely a point A in FIG. 7) is $V_{bias}$, at the signal reading stage, the leakage current $I_{RD}$ of the photodiode 1 charges the storage capacitor 22 (the capacitance is $C_2$), and the voltage at the point A is decreased by $\Delta V_{c2}$ on the basis of $V_{bias}$ and changes to be $V_A$:

$$V_A = V_{bias} - \Delta V_{c2} = V_{DD} - V_{th} - \sqrt{\frac{I_{bias}}{\beta}} - \frac{I_{RD} \times T_2}{C_2}. \quad (7)$$

It may be known according to driving characteristics of transistors, the current outputted by the driving transistor 21 at the signal reading stage is $I_s$:

$$I_s = \beta(V_{DD} - V_A - V_{th})^2 = \beta\left(\sqrt{\frac{I_{bias}}{\beta}} - \frac{I_{RD} \times T_2}{C_2}\right)^2; \quad (8)$$

when $I_{bias} >> I_{RD}$ (such as $I_{bias} > 10 I_{RD}$), $(I_{RD})^2$ is very small, and may be regarded as 0, and therefore:

$$I_s \approx I_{bias} + 2\beta\sqrt{\frac{I_{bias}}{\beta}} \times \frac{I_{RD} \times T_2}{C_2} = I_{bias} + 2\beta\frac{T_2}{C_2}\sqrt{\frac{I_{bias}}{\beta}} \times I_{RD}; \quad (9)$$

and it may be seen from a formula (9) that the leakage current $I_{RD}$ of the photodiode 1 may be amplified $$2\beta\frac{T_2}{C_2}\sqrt{\frac{I_{bias}}{\beta}}$$

times through the amplification circuit 2.

Meanwhile, the reset device 423 is controlled to reset the integrating arithmetic unit 421, then the integrating arithmetic unit 421 integrates the current I outputted at the output end 21b of the driving transistor 21, and outputs the voltage drop signal $V_{out}$. FIG. 7 is a corresponding time sequence circuit diagram. Please refer to FIG. 8, FIG. 8 is a control time sequence diagram of an optical sensing pixel circuit provided by an embodiment of the present disclosure.

Figure 8:
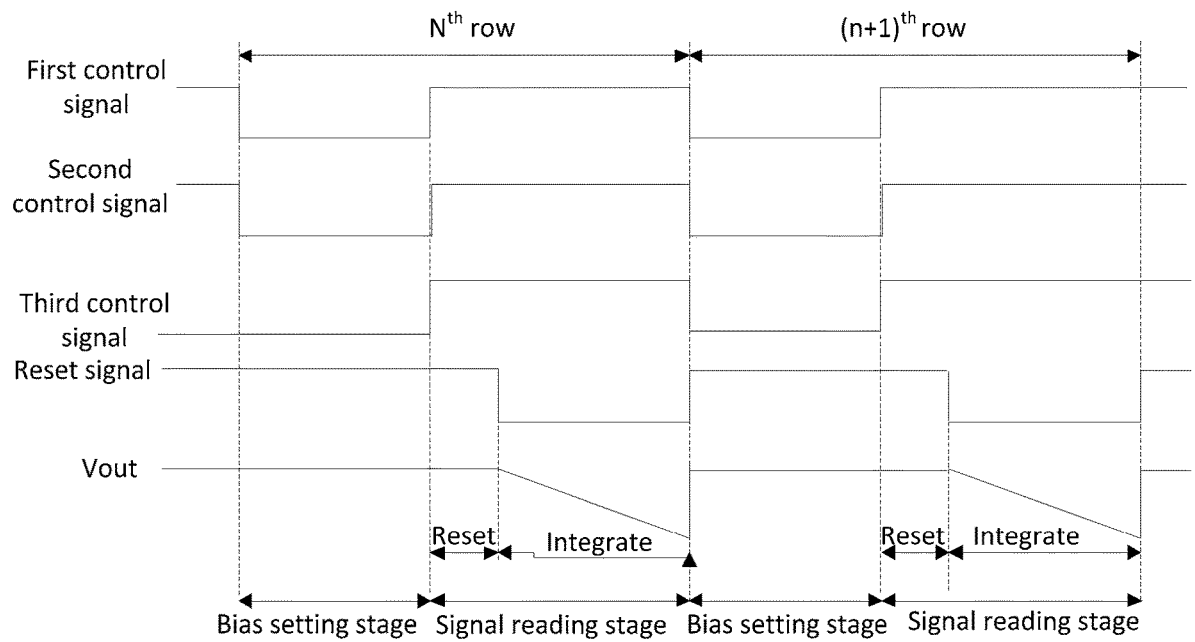
FIG. 8 is a control sequence diagram of an optical sensing pixel circuit provided by an embodiment of the present disclosure.

A first control signal and a second control signal in FIG. 8 are low-level and valid, a third control signal and a reset signal are high-level and valid. A voltage corresponding to a voltage drop signal output by a current detecting circuit 4 is $V_{ref} - V_{ci}$, and $V_{ci}$ represents a voltage of an integrating capacitor 422.

FIG. 8 further illustrates time sequences of the optical sensing pixel circuits in an $n^{th}$ row and the optical sensing pixel circuits in an $(n+1)^{th}$ row in a sensor formed by the above optical sensing pixel circuits in an array mode.

It needs to be noted that in FIG. 8, the first control signal, the second control signal and the third control signal are related to the type of corresponding transistors, when the type of the corresponding transistors are P-type transistors, and the corresponding control signal is low-level, the P-type transistors are turned on, and when the type of the corresponding transistors are N-type transistors, and the corresponding control signal is high-level, the N-type transistors are turned on.

Based on the same inventive concept, an embodiment of the present disclosure provides a driving method of the above optical sensing pixel circuit. Please refer to FIG. 9, the driving method includes:

step 901: at a bias setting stage, a first switching transistor and a second switching transistor are switched on, a first voltage corresponding to outputting of a constant current is set for a driving transistor of an amplification circuit, and the first voltage is stored in a storage capacitor, wherein the first voltage is a voltage difference between a control end of the driving transistor and a first end of the driving transistor, and the first voltage includes a threshold voltage of the driving transistor; and step 902: at a signal reading stage, the first switching transistor and a second switching transistor are switched off, a third switching transistor is switched on, meanwhile, an integrating circuit is reset, then the third switching transistor is disconnected, so that the integrating circuit starts to integrate a current signal outputted at the output end of the amplification circuit, a voltage variable quantity is generated on an integrating capacitor, and a current output by the amplification circuit is calculated according to integrating time and the voltage variable quantity.

The above processing process please refer to the bias setting stage and the signal reading stage in the above optical sensing pixel circuit, which will not be introduced herein.

Figure 10:
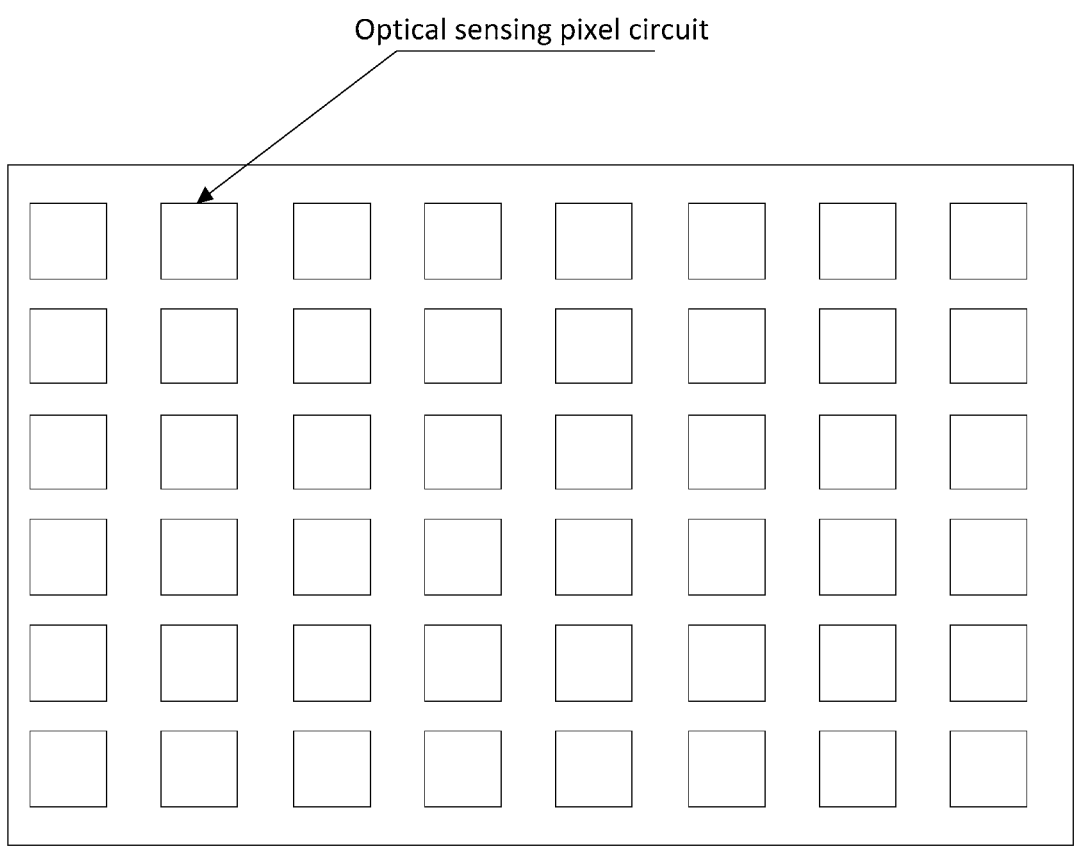
FIG. 10 is a first schematic structural diagram of a sensor provided by an embodiment of the present disclosure.

Based on the same inventive concept, an embodiment of the present disclosure provides a sensor. Please refer to FIG. 10, and FIG. 10 is a first schematic structural diagram of a sensor provided by an embodiment of the present disclosure. The sensor includes the above optical sensing pixel circuits distributed in an array. The sensor may be a sensor for fingerprint identification.

Figure 11:
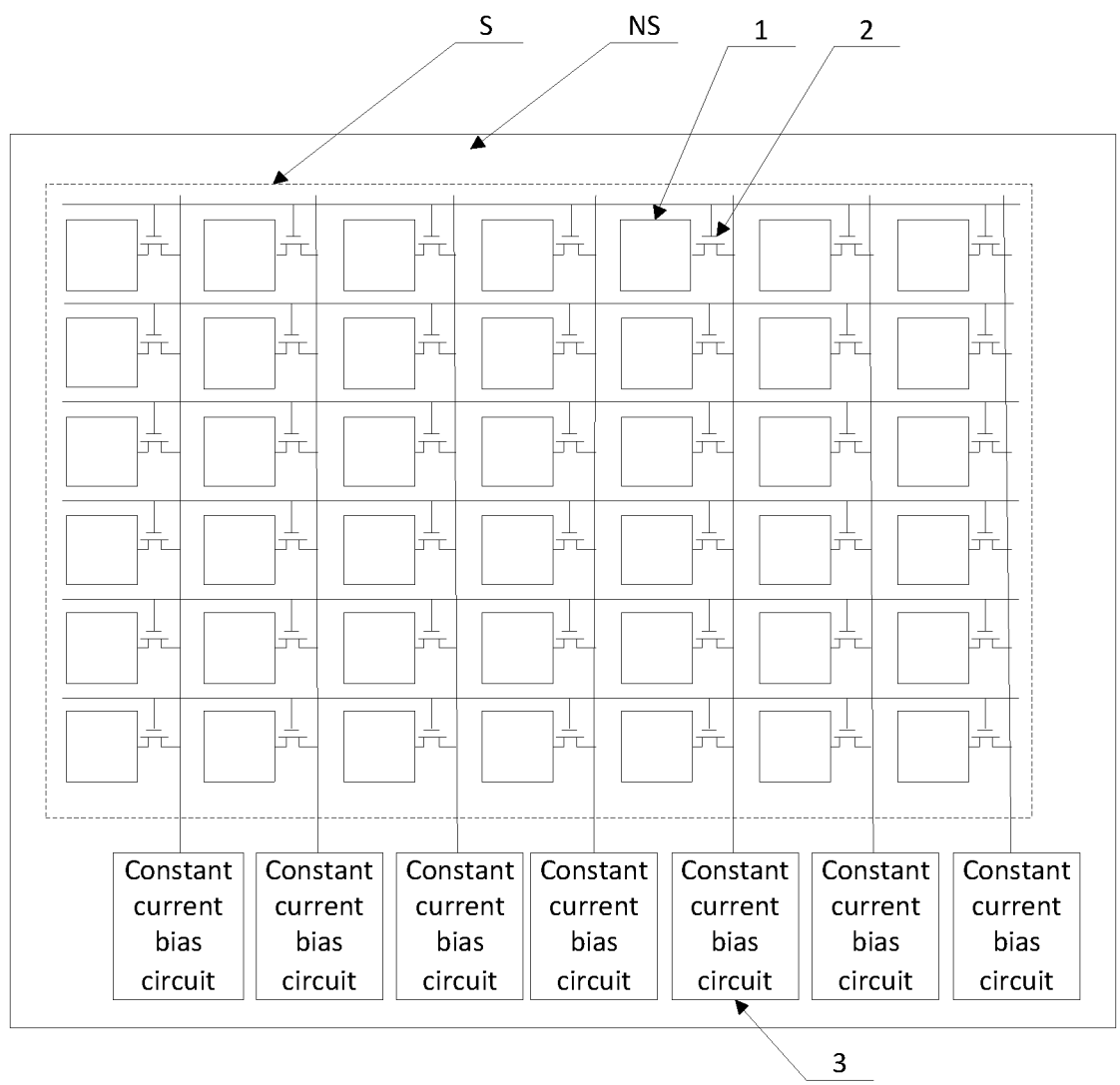
FIG. 11 is a second schematic structural diagram of a sensor provided by an embodiment of the present disclosure.

Please refer to FIG. 11, and FIG. 11 is a second schematic structural diagram of a sensor provided by an embodiment of the present disclosure. The optical sensing pixel circuits arranged in the same column share one constant current circuit 3.

The optical sensing pixel circuits arranged in the same column share one constant current circuit 3, so that the quantity of the constant current circuit 3 may be reduced, and spaces occupied by the constant current circuit 3 may be saved.

Please refer to FIG. 11, the sensor includes a detection area S and a non-detection area NS surrounding outside the detection area; and a plurality of photodiodes 1 are arranged in an array in the detection area S, the photodiodes 1 and the corresponding amplification circuit 2 are arranged together, and the constant current circuits 3 are arranged in the non-detection area NS.

The constant current circuits 3 are arranged in the non-detection area NS, so that the constant current circuits 3 are conveniently distributed.

It needs to be noted that in FIG. 11, a diagram from of the amplification circuit 2 should not be understood that the amplification circuit 2 is only a transistor, and the structure thereof may refer to related descriptions in the optical sensing pixel circuits, which will not be repeated herein. The quantity of the optical sensing pixel circuits shown in FIG. 10 and FIG. 11 does not represent a true quantity, and the quantity of the optical sensing pixel circuits needed in one sensor may be autonomously set according to actual requirements.

The sensor may be an on-screen sensor, may be an under-screen sensor, may be separately applied to a photoelectric detection device such as a time recorder and an access control, and may also be applied to mobile devices such as a mobile phone, a tablet personal computer and a smart watch.

Based on the same inventive concept, an embodiment of the present disclosure provides a display panel, including the above sensor.

Although the preferred embodiments of the present disclosure have been described, those skilled in the art can make additional changes and modifications on these embodiments once they know the basic creative concept. So the appended claims are intended to include the preferred embodiments and all changes and modifications that fall into the scope of the present disclosure.

Apparently, those skilled in the art may perform various changes and modifications on the embodiments of the present disclosure without departing from the spirit and scope of the embodiments of the present disclosure. Therefore, if these changes and modifications on the embodiments of the present disclosure fall in the scope of the claims of the present disclosure and their equivalent technologies, the present disclosure is intended to include these changes and modifications.

What is claimed is:

1. An optical sensing pixel circuit, comprising:
    a photodiode, one end of the photodiode being electrically connected with a constant voltage end, wherein the photodiode is configured to detect an external optical signal and convert the optical signal into an electric signal, and the electric signal is weak and is not easily detected;
    an amplification circuit, electrically connected with an output end of the photodiode, wherein the amplification circuit is configured to amplify the electric signal into a detectable large current signal; and
    a constant current bias circuit, electrically connected with an output end of the amplification circuit, wherein the constant current bias circuit is configured to provide a constant current for the amplification circuit so as to set a quiescent operating point with a same current as the constant current for the amplification circuit, wherein the amplification circuit is further configured to amplify the electric signal on the basis of the quiescent operating point.

2. The optical sensing pixel circuit according to claim 1, wherein the constant current bias circuit comprises:
    a constant current source, configured to provide the constant current; and
    a first switching transistor, connected between the constant current source and the output end of the amplification circuit, wherein the first switching transistor is configured to provide the constant current to the amplification circuit at a bias setting stage.

3. The optical sensing pixel circuit according to claim 1, wherein the amplification circuit comprises:
    a driving transistor, a first end of the driving transistor being electrically connected with the constant voltage end, a second end of the driving transistor serving as the output end of the amplification circuit, and a control end of the driving transistor being electrically connected with the output end of the photodiode;
    a storage capacitor, one end of the storage capacitor being electrically connected with the constant voltage end, and a second end of the storage capacitor being electrically connected with the control end of the driving transistor, wherein the storage capacitor is configured to store a first voltage of the driving transistor and receive the electric signal in a case that an output current of the driving transistor is the constant current, the first voltage is a voltage difference between the control end of the driving transistor and the first end of the driving transistor, and the first voltage comprises a threshold voltage of the driving transistor; and
    a second switching transistor, a first end of the second switching transistor being electrically connected with the control end of the driving transistor, and a second end of the second switching transistor being electrically connected with the second end of the driving transistor, wherein the second switching transistor is configured to be switched on at the bias setting stage, so that the driving transistor stores the first voltage into the storage capacitor under an action of the constant current, and the driving transistor outputs the constant current at an amplification state.

4. The optical sensing pixel circuit according to claim 3, wherein the constant current is 10 times greater than a leakage current of the photodiode.

5. The optical sensing pixel circuit according to claim 1, further comprising:
    a current detecting circuit, electrically connected with the output end of the amplification circuit, wherein the current detecting circuit is configured to detect the large current signal at a signal reading stage, and convert the large current signal into a corresponding voltage drop signal.

6. The optical sensing pixel circuit according to claim 5, wherein the current detecting circuit comprises:
    a third switching transistor, a first end of the third switching transistor being electrically connected with the output end of the amplification circuit, wherein the third switching transistor is switched on at the signal reading stage, and configured to receive the large current signal; and
    an integrating circuit, an input end of the integrating circuit being electrically connected with a second end of the third switching transistor, an output end of the integrating circuit serving as an output end of the current detecting circuit, wherein the integrating circuit is configured to be reset after a reset end of the integrating circuit receives a reset signal, and integrate the large current signal after being reset to generate the voltage drop signal.

7. The optical sensing pixel circuit according to claim 6, wherein the integrating circuit comprises:
    an integrating arithmetic unit, a first input end of the integrating arithmetic unit serving as an input end of the integrating circuit, an output end of the integrating arithmetic unit serving as the output end of the integrating circuit, and a second end of the integrating arithmetic unit being connected with a reference voltage end;
    an integrating capacitor, a first end of the integrating capacitor being electrically connected with the first input end of the integrating arithmetic unit, and a second end of the integrating capacitor being electrically connected with the output end of the integrating arithmetic unit, wherein the integrating capacitor is configured to integrate the large current signal and generate a voltage drop on the integrating capacitor; and a reset device, a first end of the reset device being electrically connected with the first input end of the integrating arithmetic unit, a second end of the reset device being electrically connected with the output end of the integrating arithmetic unit, wherein the reset device is configured to reset the integrating capacitor and the out end of the amplification circuit.

8. A driving method of the optical sensing pixel circuit according to claim 1, comprising:
at a bias setting stage, switching on a first switching transistor and a second switching transistor, making a constant current bias circuit provide a constant current for an amplification circuit, so as to set a first voltage corresponding to outputting of the constant current for a driving transistor of the amplification circuit, and store the first voltage into a storage capacitor, wherein the first voltage is a voltage difference between a control end of the driving transistor and a first end of the driving transistor, and the first voltage comprises a threshold voltage of the driving transistor; and
at a signal reading stage, switching off the first switching transistor and the second switching transistor, switching on a third switching transistor, meanwhile, firstly resetting an integrating circuit, then disconnecting the third switching transistor, so as to make the integrating circuit start to integrate a current signal at an output end of the amplification circuit, generate a voltage variable quantity on an integrating capacitor, and calculate currents output by the amplification circuit according to integrating time and the voltage variable quantity.

9. A sensor, comprising the optical sensing pixel circuits according to claim 1, wherein the optical sensing pixel circuits are arranged in an array.

10. The sensor according to claim 9, wherein the optical sensing pixel circuits located in a same column share one constant current bias circuit.

11. The sensor according to claim 10, wherein the sensor comprises a detection area and a non-detection area surrounding the detection area;
a plurality of photodiodes are arranged in an array in the detection area; and
the constant current bias circuit is arranged in the non-detection area.

12. A display panel, comprising the sensor according to claim 9.

13. The sensor according to claim 9, wherein the constant current bias circuit comprises:
a constant current source, configured to provide the constant current; and
a first switching transistor, connected between the constant current source and the output end of the amplification circuit, wherein the first switching transistor is configured to provide the constant current to the amplification circuit at a bias setting stage.

14. The sensor according to claim 9, wherein the amplification circuit comprises:
a driving transistor, a first end of the driving transistor being electrically connected with the constant voltage end, a second end of the driving transistor serving as the output end of the amplification circuit, and a control end of the driving transistor being electrically connected with the output end of the photodiode;
a storage capacitor, one end of the storage capacitor being electrically connected with the constant voltage end, and a second end of the storage capacitor being electrically connected with the control end of the driving transistor, wherein the storage capacitor is configured to store a first voltage of the driving transistor and receive the electric signal in a case that an output current of the driving transistor is the constant current, the first voltage is a voltage difference between the control end of the driving transistor and the first end of the driving transistor, and the first voltage comprises a threshold voltage of the driving transistor; and
a second switching transistor, a first end of the second switching transistor being electrically connected with the control end of the driving transistor, and a second end of the second switching transistor being electrically connected with the second end of the driving transistor, wherein the second switching transistor is configured to be switched on at the bias setting stage, so that the driving transistor stores the first voltage into the storage capacitor under an action of the constant current, and the driving transistor outputs the constant current at an amplification state.

15. The sensor according to claim 14, wherein the constant current is 10 times greater than a leakage current of the photodiode.

16. The sensor according to claim 9, further comprising:
a current detecting circuit, electrically connected with the output end of the amplification circuit, wherein the current detecting circuit is configured to detect the large current signal at a signal reading stage, and convert the large current signal into a corresponding voltage drop signal.

17. The sensor according to claim 16, wherein the current detecting circuit comprises:
a third switching transistor, a first end of the third switching transistor being electrically connected with the output end of the amplification circuit, wherein the third switching transistor is switched on at the signal reading stage, and configured to receive the large current signal; and
an integrating circuit, an input end of the integrating circuit being electrically connected with a second end of the third switching transistor, an output end of the integrating circuit serving as an output end of the current detecting circuit, wherein the integrating circuit is configured to be reset after a reset end of the integrating circuit receives a reset signal, and integrate the large current signal after being reset to generate the voltage drop signal.

18. The sensor according to claim 17, wherein the integrating circuit comprises:
an integrating arithmetic unit, a first input end of the integrating arithmetic unit serving as an input end of the integrating circuit, an output end of the integrating arithmetic unit serving as the output end of the integrating circuit, and a second end of the integrating arithmetic unit being connected with a reference voltage end;
an integrating capacitor, a first end of the integrating capacitor being electrically connected with the first input end of the integrating arithmetic unit, and a second end of the integrating capacitor being electrically connected with the output end of the integrating arithmetic unit, wherein the integrating capacitor is configured to integrate the large current signal and generate a voltage drop on the integrating capacitor; and a reset device, a first end of the reset device being electrically connected with the first input end of the integrating arithmetic unit, a second end of the reset device being electrically connected with the output end of the integrating arithmetic unit, wherein the reset device is configured to reset the integrating capacitor and the out end of the amplification circuit.

19. A display panel, comprising the sensor according to claim 10.

20. A display panel, comprising the sensor according to claim 11.

* * * * *